United States Patent
Han et al.

(10) Patent No.: US 9,672,394 B2
(45) Date of Patent: Jun. 6, 2017

(54) SYSTEM AND METHOD FOR SECURING BACKSCATTER WIRELESS COMMUNICATION

(71) Applicants: University of Houston System, Houston, TX (US); Trustees of Princeton University, Princeton, NJ (US); University of Miami, Miami, FL (US)

(72) Inventors: Zhu Han, Sugar Land, TX (US); Walid Saad, Coral Gables, FL (US); Harold Vincent Poor, Princeton, NJ (US)

(73) Assignees: UNIVERSITY OF MIAMI, Miami, FL (US); UNIVERSITY OF HOUSTON SYSTEM, Houston, TX (US); THE TRUSTEES OF PRINCETON UNIVERSITY, Princeton, NJ (US)

( * ) Notice: Subject to any disclaimer, the term of this patent is extended or adjusted under 35 U.S.C. 154(b) by 118 days.

(21) Appl. No.: 14/010,650

(22) Filed: Aug. 27, 2013

(65) Prior Publication Data
US 2014/0232528 A1  Aug. 21, 2014

Related U.S. Application Data

(60) Provisional application No. 61/693,622, filed on Aug. 27, 2012.

(51) Int. Cl.
*G06K 7/08* (2006.01)
*G06K 7/10* (2006.01)
*H04B 5/00* (2006.01)

(52) U.S. Cl.
CPC ....... *G06K 7/10366* (2013.01); *H04B 5/0056* (2013.01); *H04B 5/0062* (2013.01)

(58) Field of Classification Search
CPC .......... G06K 7/10217; G06K 7/10227; G06K 7/10198; G06K 7/10237; G06K 7/10287;
(Continued)

(56) References Cited

U.S. PATENT DOCUMENTS

2007/0149237 A1* 6/2007 Russell ................. H04W 52/28
  455/522
2007/0177738 A1* 8/2007 Diorio ................. G06K 7/0008
  380/270

(Continued)

FOREIGN PATENT DOCUMENTS

JP  WO 2009022423 A1 *  2/2009  ............... H04K 1/02

OTHER PUBLICATIONS

O. Savory et al., RFID Noisy Reader; How to Prevent from Eavesdropping on the Communication? CHESS 2007, LNCS 4727, pp. 334-345, 2007.*

(Continued)

*Primary Examiner* — Omeed Alizada
*Assistant Examiner* — Mancil Littlejohn, Jr.
(74) *Attorney, Agent, or Firm* — Conley Rose, P.C.

(57) ABSTRACT

A system and method for securing backscatter communication. In one embodiment, a backscatter communication system includes a reader. The reader is configured to receive backscatter transmissions. The reader includes a transmitter configured to emit a radio frequency signal to induce backscatter communication. The transmitter includes a continuous wave (CW) carrier signal generator and a noise signal generator. The CW carrier signal generator produces a CW carrier signal. The noise signal generator generates a noise signal. The transmitter is configured to combine the CW carrier signal and the noise signal, and to transmit the combined signal to induce backscatter communication.

20 Claims, 3 Drawing Sheets

(58) Field of Classification Search
CPC .............. G06K 7/10366; G06K 7/10; G06K 19/07327; G06K 7/0008; G06K 7/10257; G06K 19/07336; H04B 5/0056; H04B 5/0062; H01Q 7/00; H01Q 1/2225; H04L 9/0656
USPC .............. 340/10.1–10.6, 5.4; 375/298, 316; 455/130
See application file for complete search history.

(56) References Cited

U.S. PATENT DOCUMENTS

| | | | |
|---|---|---|---|
| 2007/0201405 A1* | 8/2007 | Santhanam | H04W 52/10 370/335 |
| 2007/0206704 A1* | 9/2007 | Zhou | G06K 7/0008 375/316 |
| 2007/0298798 A1* | 12/2007 | Hagerman | H04W 36/18 455/436 |
| 2008/0174410 A1 | 7/2008 | Sarangapani et al. | |
| 2009/0021343 A1* | 1/2009 | Sinha | 340/5.2 |
| 2010/0289627 A1* | 11/2010 | McAllister et al. | 340/10.42 |
| 2011/0084796 A1* | 4/2011 | Savry | G06K 7/10257 340/5.8 |
| 2011/0133890 A1 | 6/2011 | Duron et al. | |
| 2011/0140858 A1 | 6/2011 | Ovard et al. | |
| 2011/0181397 A1 | 7/2011 | Kang et al. | |
| 2013/0342317 A1* | 12/2013 | Rimai | G06K 7/10069 340/10.1 |
| 2014/0118116 A1* | 5/2014 | Lavedas | 340/10.3 |

OTHER PUBLICATIONS

International Application No. PCT/US2013/056853, PCT International Search Report and Written Opinion dated Dec. 10, 2013 (11 pgs.).

* cited by examiner

SYSTEM AND METHOD FOR SECURING BACKSCATTER WIRELESS COMMUNICATION

CROSS-REFERENCE TO RELATED APPLICATION

The present application claims priority to U.S. Provisional Patent Application No. 61/693,622, filed on Aug. 27, 2012, entitled "A Method for Securing Backscatter Wireless Communication," which is hereby incorporated herein by reference in its entirety.

STATEMENT REGARDING FEDERALLY SPONSORED RESEARCH OR DEVELOPMENT

This invention was made with government support under Grant No. N00014-12-1-0767 awarded by the Office of Naval Research. The government has certain rights in this invention.

BACKGROUND

Backscatter communication is a wireless transmission technique that is used in some short-range, wireless communication systems. In particular, backscatter-based radio frequency identification (RFID) is a wireless technology that allows interconnection of physical objects through the use of small, inexpensive integrated circuits, i.e., RFID tags, that are remotely powered by a wireless RFID reader. Recent advances in backscatter systems, such as the emergence of sensor equipped, semi-passive RFID tags have positioned backscatter technology to provide the physical world with cyber-capabilities such as computation and communication.

SUMMARY

A system and method for securing backscatter communication are disclosed herein. In one embodiment, a backscatter communication system includes a reader. The reader is configured to receive backscatter transmissions. The reader includes a transmitter configured to emit a radio frequency signal to induce backscatter communication. The transmitter includes a continuous wave (CW) carrier signal generator and a noise signal generator. The CW carrier signal generator produces a CW carrier signal. The noise signal generator generates a noise signal. The transmitter is configured to combine the CW carrier signal and the noise signal, and to transmit the combined signal to induce backscatter communication.

In another embodiment, a method for backscatter communication includes generating a CW carrier signal, and generating a noise signal. The CW carrier signal and the noise signal are combined, and the combined signal is transmitted. A backscatter transmission induced by the combined signal is received. Information encoded in the backscatter transmission is extracted by filtering the noise signal from the backscatter transmission.

In a further embodiment, a radio frequency identification (RFID) reader includes a power allocation subsystem and a transmitter. The power allocation subsystem is configured to determine an amount of power to be allocated to transmission of each of a CW carrier signal and a noise signal. The transmitter is configured to combine the CW carrier signal and noise signal and to emit the combined signal to induce backscatter communication by an RFID tag.

BRIEF DESCRIPTION OF THE DRAWINGS

For a detailed description of various examples, reference will now be made to the accompanying drawings in which.

NOTATION AND NOMENCLATURE

Figure 1:
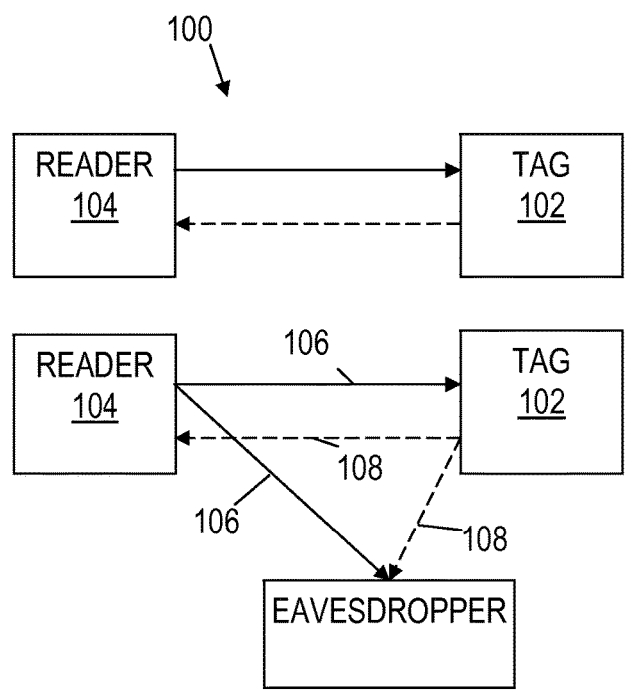
FIG. 1 shows a block diagram of a radio frequency identification (RFID) communication system in accordance with principles disclosed herein.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Deployment of large-scale backscatter communication systems, such as radio frequency identification (RFID) based systems, faces a variety of challenges. In particular, securing such systems is a key issue because attacks on the system, e.g., eavesdropping the transmitted data, can lead not only to data interception but also to serious privacy breaches such as owner tracking or identity modification. Cost, size, and computational limitations make securing RFID systems difficult. Due to these limitations, the implementation of classical cryptographic techniques in small scale backscatter systems, such as RFID systems, is infeasible in practice.

Conventional RFID security solutions are generally based on lightweight cryptography, a scaled-down version of standard cryptography. Lightweight cryptography provides security against some attacks, but exhibits serious vulnerabilities. Beyond lightweight cryptographic techniques, attempts to implement basic cryptographic schemes, such as the RC5 algorithm, on RFID tags have proven feasible only at very short ranges (e.g., 0:75 meters) and by using prototype tags which possess higher storage and computational power that state-of-the-art electronic product code UHF tags.

Embodiments of the present disclosure include a novel low-complexity security solution that is tailored to the resource-constrained nature of backscatter communication systems. Embodiments advantageously employ physical layer (PHY) security mechanisms that apply wireless channel characteristics such as fading and noise, traditionally seen as impediments, for defending wireless transmission against eavesdropping. Accordingly, the backscatter communication techniques disclosed herein provide security without the need for secret key generation or other computationally complex aspects of standard cryptography.

Embodiments optimize the secrecy rate of RFID systems by exploiting two key features of the RFID backscatter channel: (i) the nature of the backscatter channel in which the signal transmitted by the RFID reader is modulated and relayed by the RFID tag to the reader; and (ii) the presence of a signal continuously transmitted by the RFID reader for powering the RFID tag during communication. In the communication system disclosed herein, RFID readers append artificial noise signals to the continuous wave signals that propagate via the backscatter channel thereby inducing interference at eavesdroppers. Each reader optimizes the allocation of power between the continuous wave signal and the artificial noise signal. The readers determine an optimal power allocation so as to maximize the overall secrecy rates. The secrecy rate represents the maximum rate with which the reader and tag can communicate without being tapped by an eavesdropper.

Some embodiments determine the power allocation as a noncooperative continuous-kernel game. The game may use a best-response based algorithm via which the readers find Nash equilibrium of the game. By using artificial noise combined with the aforementioned game, embodiments yield significant performance gains in terms of the average secrecy rate per reader.

FIG. 1 shows a block diagram of an RFID communication system 100 in accordance with principles disclosed herein. The system includes a plurality of RFID tags 102 and a plurality of RFID tag readers 104. In practice the system 100 may include one or more RFID tags 102 and/or one or more RFID tag readers 104. One or more eavesdroppers (eavesdropping devices) may be present to intercept communication between the RFID tags 102 and the RFID tag readers 104.

In the system 100, communication between reader 104 and the tag 102 occurs over a backscatter channel. The RFID reader 104 transmits a modulated signal by amplitude modulation of a continuous wave (CW) carrier signal. The carrier signal induces an RF voltage across an antenna of the tag 102. The induced voltage is used to power the tag 102. The tag 102 transmits information to the reader 104 by controlling the amount of backscatter of the impinging downlink signal. In other words, the tag 102 does not generate its own signal, but rather appends its information by modulating the downlink signal which is subsequently "backscattered" to the reader 104. Mutual interference between tags communicating with a common reader may be mitigated by an anti-collision medium access control (MAC) protocol. The RFID tag 102 may be any wireless device that transmits information via backscattering, the RFID reader 104 may be any wireless device that is configured to power the tag 102 via CW carrier signal and receive the data transmitted by the tag 102 via backscatter transmission.

In the system 100, the signal 106 transmitted by the reader 104 includes a noise signal that is unknown to an eavesdropper. The noise signal induces interference in the eavesdropper, thereby obfuscating the backscatter transmission 108 from the tag 102, and advantageously increasing the secrecy rate of the system 100.

In an RFID communication channel, the signal backscattered by a tag $k \in K_i$ toward the receive antenna of a reader i is given by:

$$y_{k,i}(t) = h_{k,i} s_k(t) h_{i,k} x_i(t) + \sum_{j \in N, j \neq i} h_{j,i} x_j(t) + n_i(t) \quad (1)$$

where:
$x_i(t)$ is the CW signal transmitted by reader i;
$s_k(t)$ is the reflection coefficient of the tag,
$h_k$, and $h_{i,k}$ are, respectively, the tag-reader and reader-tag channel gains,
$h_{j,i}$ is the channel gain between reader i and reader j, and
$n_i(t)$ is the noise.

In conventional backscatter system operation, reader i knows the CW signal $x_j(t)$ transmitted by neighboring readers (the signal is a standardized UHF carrier signal) and, hence, reader i is able to cancel the third term in equation (1) using known signal processing techniques.

Using the Friis equation to link the transmit and received powers, for any reader $i \in N$ having a transmit power $P_i$, the received power following the backscatter by a tag k is given by:

$$P_{i,k}^{rx} = P_i \Gamma_k G_{i,k}^2 G_k^2 \left(\frac{\lambda}{4\pi d_{i,k}}\right)^4 \quad (2)$$

where:
$\Gamma_k = |s_k(t)|^2$ is the backscatter transmission loss;
$G_{i,k}$ is the antenna gain of reader i for the signal perceived at tag k;
$G_k$ is the antenna gain of tag k;
$\lambda$ is the wavelength; and
$d_{i,k}$ is the distance between reader i and tag k.

During backscatter communication, each reader i continuously transmits its CW signal $x_j(t)$ to power the tag circuits. Therefore, at any eavesdropper $m \in M$, the received signal pertaining to the backscatter communication between a reader $i \in N$ and a tag $k \in K_t$ is given by:

$$y_{k,i,m}(t) = h_{k,m} s_k(t) h_{i,k} x_i(t) + \sum_{j \in N} h_{j,m} x_j(t) + n_m(t) \quad (3)$$

where $h_{k,m}$ and $h_{j,m}$ represent, respectively, the tag-eavesdropper and reader-eavesdropper channels.

The second term of equation (3) corresponds to the CW signal transmitted on the forward reader-tag links, and constitutes a potential interference at the eavesdropper. However, in conventional RFID systems, the eavesdropper knows the CW $x_j(t)$ transmitted by any reader j∈N and is able to cancel the effect of the term $$\sum_{j \in N} h_{j,m} x_j(t).$$

In accordance with the Friis equation, the received power at eavesdropper m following the backscatter communication between reader i and tag k is given by:

$$P_{i,k,m}^{rx} = P_i \Gamma_k G_{i,m} G_m G_k^2 \left(\frac{\lambda}{4\pi d_{i,k}}\right)^2 \left(\frac{\lambda}{4\pi d_{k,m}}\right)^2 \quad (4)$$

where:

$G_{i,m}$ is the reader's antenna gain for the signal received at the eavesdropper m;
$G_m$ is the antenna gain of eavesdropper m; and
$d_{k,m}$ is the distance between tag k and eavesdropper m.

The physical layer security of the RFID system characterized by the secrecy rate $C_{i,k}$ achieved during the backscatter communication between reader i and tag k, in the presence of the eavesdroppers in M is given by:

$$C_{i,k} = \left(C_{i,k}^d - \max_{m \in M} C_{i,k,m}\right)^+ \quad (5)$$

where $a^+ \triangleq \max(a, 0)$.

In equation (5), $C_{i,k}^d = \log(1+\gamma_{i,k})$ is the capacity of the backscatter transmission between reader i and tag k, with $$\gamma_{i,k} = \frac{P_{i,k}^{rx}}{\sigma^2}$$

being the signal-to-noise ratio (SNR) and $\sigma^2$ is the variance of the noise. $C_{i,k,m} = \log(1+\gamma_{i,k,m})$ is the capacity of the backscatter transmission between reader i and tag k as received at eavesdropper m with $$\gamma_{i,k,m} = \frac{P_{i,k,m}^{rx}}{\sigma^2}$$

being the SNR as received at m.

Embodiments of the system 100 improve the secrecy rate versus conventional backscatter communication systems, by exploiting two key features of backscatter communication: (i) the nature of the backscatter channel in which the CW signal is modulated by the tag and transmitted back to the reader; and (ii) the fact that the CW signal is continuously transmitted by the RFID reader for powering the passive RFID tag during the entire communication process. Equation (3) shows that, by using a signal from the readers as disclosed herein, it is possible to induce interference on any eavesdropper m, thereby reducing the capacity received at the eavesdropper. During the CW transmission, the eavesdropper receives the CW signal as seen in the second term of equation (3). In conventional RFID systems, the eavesdropper has an almost complete knowledge of the CW $x_i(t)$ transmitted by any reader i, and, hence, the eavesdropper is able to cancel this term.

The system 100 exploits this feature of the RFID backscatter channel so as to introduce additional interference at the eavesdroppers. More specifically, the reader 104 appends to the CW signal $x_i(t)$ a random noise signal $z_i(t)$ generated and known by reader 104 but unknown to the eavesdroppers. Instead of transmitting $x_i(t)$, each reader i∈N of the system 100 transmits $x_i(t)+z_i(t)$. Accordingly, the backscatter signal between reader i and tag k in the presence of the added noise signal (after canceling the known CW signals $x_j(t), \forall j \in N\setminus\{i\}$) is given by:

$$\hat{y}_{k,i}(t) = h_{k,i} s_k(t) h_{i,k} x_i(t) + \sum_{j \in N, j \neq i} h_{j,i} z_j(t) + n_i(t) \quad (6)$$

where $\sum_{j \in N, j \neq 1} h_{j,i} z_j(t)$ is inter-reader interference. The impact of the artificial noise signal $z_j(t)$ backscattered by the tags belonging to the readers in N\{i} is assumed to be negligible because the backscattered signal's power is much smaller than the power of the forward reader-tag link.

Similarly, at any eavesdropper m∈M, the received signal pertaining to the backscatter communication between a reader i∈N and a tag k∈$K_i$ in the presence of an artificial noise signal transmitted by all readers is given by:

$$\hat{y}_{k,i,m}(t) = h_{k,m} s_k(t) h_{i,k} x_i(t) + h_{i,m} z_i(t) + \sum_{j \in N, j \neq i} h_{j,m} z_j(t) + n_m(t) \quad (7)$$

where:
$h_{i,m} z_i(t)$ is interference from reader i; and $$\sum_{j \in N, j \neq 1} h_{j,m} z_j(t)$$

is interference induced from readers in N\{i}.

Equations (6) and (7) show that for a single reader embodiment of the system 100, the inclusion of an artificial noise signal by the reader 104 reduces the received power at the eavesdropper and, consequently, can lead an improved secrecy rate in equation (5) due to the reduced capacity as received at the eavesdroppers. Furthermore, for a multi-reader system 100, the use of a random artificial noise signal at any reader induces interference, not only on the eavesdroppers but also at other readers in the system 100 and accordingly the system 100 is configured to optimize the readers' secrecy.

Because each reader adds an artificial noise signal $z_i(t)$ to its CW $x_i(t)$, each reader determines how to allocate power between the CW signal and the artificial noise. For each reader i∈N, $\alpha_i \tilde{P}$, $\alpha_i \in [0, \alpha_{i,max}]$ is the amount of power that the reader allocates to the artificial noise signal, with $\alpha_{i,max} < 1$ being the maximum amount of power that can be used for noise. Consequently, $(1-\alpha_i)\tilde{P}$ corresponds to the power allocated to the CW signal. Accordingly, the signal-tointerference-plus-noise ratio (SINR) received at reader i during backscatter communication with a tag k∈$K_i$ is given by:

$$\hat{\gamma}_{i,k} = \frac{\hat{P}_{i,k}^{rx}}{\sigma^2 + \sum_{j \in N, j \neq i} P_{j,i}^{rr}} \quad (8)$$

where $\hat{P}_{i,k}^{rx}$ is as shown in equation (2) with $p_i=(1-\alpha_i)\tilde{P}$, and $P_{j,i}^{rT}$ is given by:

$$P_{j,i}^{rr} = \alpha_j \tilde{P} G_{j,i} G_i \left(\frac{\lambda}{4\pi d_{i,j}}\right)^2 \quad (9)$$

where $\alpha_j \tilde{P}$ is the power of the noise generated by reader j, which interferes at reader i.

Similarly, the SINR received at eavesdropper m during the backscatter communication between any reader i∈N and tag k∈$K_i$ is:

$$\hat{\gamma}_{i,k,m} = \frac{\hat{P}_{i,k,m}^{rx}}{\sigma^2 + \sum_{j \in N} P_{j,m}^{re}} \quad (10)$$

where $\hat{P}_{i,k,m}^{rx}$ is given in equation (4) with $P_i=(1-\alpha_i)\tilde{P}$, and $P_{j,m}^{re}$ is given by:

$$P_{j,m}^{re} = \alpha_j \tilde{P} G_{j,m} G_m \left(\frac{\lambda}{4\pi d_{j,m}}\right)^2 \quad (11)$$

where $\alpha_j \tilde{P}$ is the power of the noise generated by any reader j∈N that interferes at eavesdropper m.

With all readers in N using an artificial noise signal appended to their CW transmission, the secrecy rate achieved by any reader i∈N when communicating with a tag k∈$K_i$ is given by:

$$\hat{C}_{i,k} = \left(\log(1 + \hat{\gamma}_{i,k}) - \max_{m \in M} \log(1 + \hat{\gamma}_{i,k,m})\right)^+ \quad (12)$$

with $\hat{\gamma}_{i,k}$ and $\hat{\gamma}_{i,k,m}$ as in equations (8) and (10) respectively.

Comparison of equations (12) and (5) shows that by adding an artificial noise signal the readers are able to decrease the capacity at the eavesdroppers and improve their secrecy rate. The secrecy rate gains are dependent on how the readers allocate power between the CW and the artificial noise signals. The power allocation chosen by a reader i impacts not only its own secrecy rate but also that of the neighboring readers, due to the interference added to the system as seen in equations (8) and (10). Embodiments of the reader 104 apply a game-theoretic approach to determine power allocation, so as to maximize secrecy rates.

In embodiments of the reader 104, each reader i∈N determines the fraction of power to be allocated to the added artificial noise signal $z_t(t)$. The power allocation choices by the readers are interdependent, i.e., the choice of $\alpha_i$ by a reader i affects the secrecy rate of all readers in the system 100, due to mutual interference. In embodiments of the system 100, each reader 104 adjusts its power allocation so as to optimize its secrecy rate, given the power allocations chosen by the other readers 104.

Embodiments define a noncooperative game in which the readers in N are the players. Each reader i∈N chooses the power allocations $$\alpha_i \in A_i \triangleq [0, \alpha_{i,max}]$$

that maximize the utility function:

$$U_i(\alpha_i, \alpha_{-i}) = \sum_{k \in K_i} \hat{C}_{i,k} \quad (13)$$

where $\hat{C}_{i,k}$ is given by equation (12) and $\alpha_{-i}$ is the vector of power allocations chosen by the readers in N\{i}. The utility function of equation (13) represents the total secrecy rate achieved by all tags that are communicating with reader i.

Given the utility function of equation (13), embodiments employ a noncooperative, nonzero-sum game in strategic form: $\Xi = \{N, \{A_i\}_{i \in N}, \{\{U_i\}_{i \in N}\}\}$. This game captures the interactions between the RFID readers that use artificial noise for optimizing the secrecy of their transmissions. In this game, each RFID reader i∈N can solve the following optimization problem:

$$\max_{a_i \in A_i} U_i(\alpha_i, a_{-i}) \quad (14)$$

As the strategy sets are continuous and the utility functions are continuous with respect to the actions of all players, the game Ξ is said to be a continuous-kernel game. In order to solve this game, embodiments may apply the concept of a Nash equilibrium.

A strategy profile α* constitutes a pure-strategy Nash equilibrium if, for every player i:

$$U_i(\alpha_i^*, \alpha_{-i}^*) \geq U_i(\alpha_i, \alpha_{-1}^*), \forall \alpha_i \in A_i, i \in N \quad (15)$$

Hence, for the game applied in various embodiments, the Nash equilibrium is a state in which no RFID reader i can improve its overall secrecy rate by unilaterally changing its noise power $\alpha_i^*\tilde{P}$, given that the other RFID readers choose their power allocation per the equilibrium vector $\alpha_{-i}^*$.

In order to find a Nash equilibrium of the RFID security game employed by the readers, embodiments employ the concept of a best response. The best response $r(\alpha_{-i})$ of any RFID reader i∈N to the profile of strategies $\alpha_{-i}$ is a set of power allocations for e such that:

$$r(\alpha_{-i}) = \{\alpha_i \in A_i | U_i(\alpha_i, \alpha_{-i}) \geq U_i(\alpha_i', \alpha_{-i}), \forall \alpha_i' \in A_i\} \quad (16)$$

Accordingly, embodiments of the reader 104 determine the amount of power to allocate to each of the CW carrier signal and the added noise signal by adjusting the best response until convergence to a Nash equilibrium is achieved.

Figure 2:
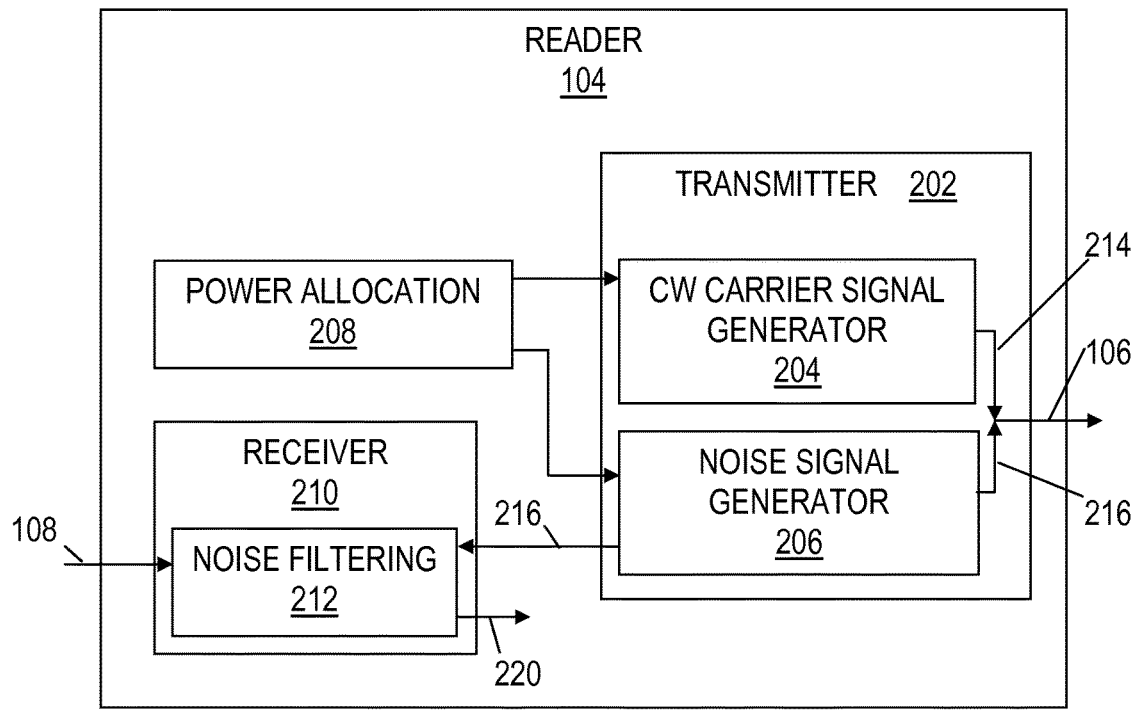
FIG. 2 shows a block diagram of an RFID reader in accordance with principles disclosed herein.

FIG. 2 shows a block diagram of the RFID reader 104. The reader 104 includes a transmitter 202, a receiver 210, a power allocation subsystem 208, and various other components and subsystems that have been omitted from FIG. 2 in the interest of clarity. For example, the reader 104 also includes antenna(s), processor(s), memory, etc.

The transmitter 202 includes a CW carrier signal generator 204 and a noise signal generator 206. The CW carrier signal generator 204 generates the continuous wave carrier signal 214 that is transmitted in conventional systems to initiate backscatter communication with a tag, and from which the tag derives power. The noise signal generator 206 generates a noise signal 216 that is combined with the CW carrier signal 214 generated by the CW carrier signal generator 204. The noise signal 216 may be, for example, a random noise signal or a pseudo-random noise signal. The transmitter 202 transmits the combined signal 106 to initiate backscatter communication with the tag 102. Transmission of the noise signal 216 in combination with the CW carrier signal 214 interferes with detection, by an eavesdropper, of backscatter transmissions 108 and increases the secrecy rate of the system 100.

The power allocation subsystem 208 determines how much power should be allocated to transmission of each of the CW carrier signal 214 and the noise signal 216. Embodiments of the power allocation subsystem 208 may determine the power allocations by iteratively adjusting the signal powers until convergence to a Nash equilibrium is achieved as described herein with regard to equations (13)-(16) and the explanation thereof.

The receiver 210 receives backscatter transmissions 108 and processes the received backscatter signal to extract the information 220 transmitted by the tag 102. The receiver 201 includes a noise filtering module 212 that removes the noise signal 216 from the received backscatter signal. The receiver 210 is able to extract the information transmitted by the tag 102 from the backscatter signal 108 because the noise signal 216 is known to the receiver. The noise signal 216 is not known to eavesdroppers, and consequently, eavesdroppers are unable to separate the noise signal 216 from the backscatter signal.

Some portions of the reader 104, e.g., the power allocation subsystem 208, may be implemented as a processor executing software instructions retrieved from a storage device. Processors suitable for use in the reader 104 may include general-purpose microprocessors, digital signal processors, microcontrollers, or other devices capable of executing instructions retrieved from a computer-readable storage device. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

Storage suitable for use in the reader 104 includes any non-transitory computer-readable storage medium suitable for storing instructions executable by a processor and/or data used by a processor. Such storage may include volatile storage such as random access memory, non-volatile storage (e.g., a hard drive, an optical storage device (e.g., CD or DVD), FLASH storage, read-only-memory), or combinations thereof.

Figure 3:
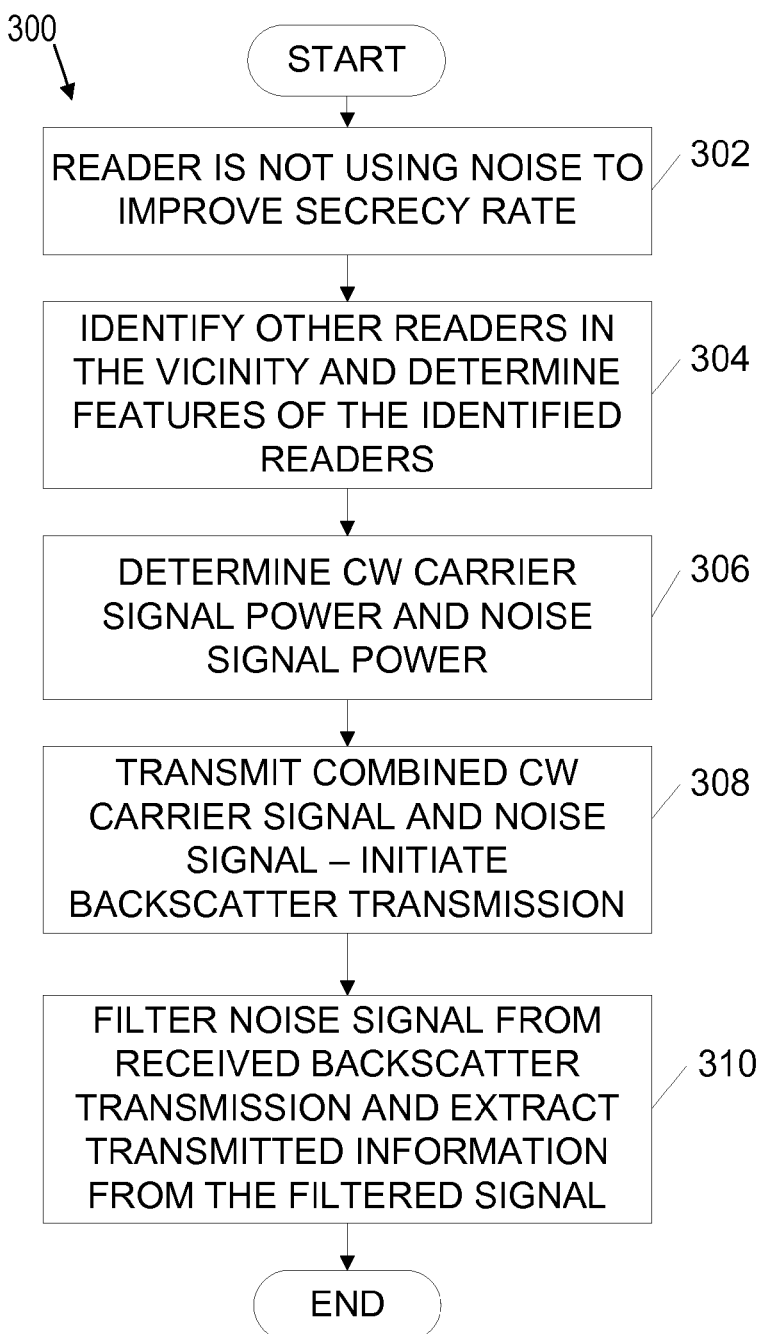
FIG. 3 shows a flow diagram for a method for backscatter communication with optimized secrecy rate in accordance with principles disclosed herein.

FIG. 3 shows a flow diagram for a method 300 for backscatter communication with optimized secrecy rate in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 300, as well as other operations described herein, can be implemented as instructions stored in computer readable storage device and executed by a processor.

In block 302, the readers of a backscatter communication system are in an initial state wherein the readers are not using any artificial noise to improve the secrecy rate.

In block 304, each of the readers executes a discovery operation to identify other readers operating in the vicinity and to determine the features of the identified readers. In some embodiments, such as pre-deployed environments, the locations and characteristics of the readers positioned in a certain area can be pre-programmed into each reader during network deployment. In more dynamic environments, e.g., systems that comprise mobile RFID readers, the discovery operation can include identification of neighboring readers via known wireless discovery techniques.

In block 306, each of the readers applies the best response algorithm disclosed herein. Each reader observes the transmissions of neighboring readers (e.g., by measuring the received CW signals), and determines the optimal power allocation (i.e., its best response), under the observed conditions. The best response dynamics phase may occur sequentially, i.e., the readers may observe their neighbors and make best response decisions in an arbitrary yet sequential order. The best response determinations continue iteratively until Nash convergence is achieved.

During the discovery and best response determination operations, the tags may not backscatter any information. Some tags may include an RFID MAC protocol that inhibits backscatter communication while the readers are performing discovery and best response determination operations. Accordingly, no tag information may be transmitted until the readers have determined how best to secure the system 100.

In block 308, the readers have achieved a Nash equilibrium, and collect information from the tags. The readers transmit a CW carrier signal that includes added noise signal to induce backscatter transmission by the tags, and data is backscattered from the tags to the readers. In essence, once equilibrium is achieve, the actual backscatter communication occurs.

In block 310, the reader 104 receives the backscatter transmission and filters the noise signal from the received backscatter signal. The information transmitted by the tag 102 is extracted from the filtered backscatter signal.

Figure 4:
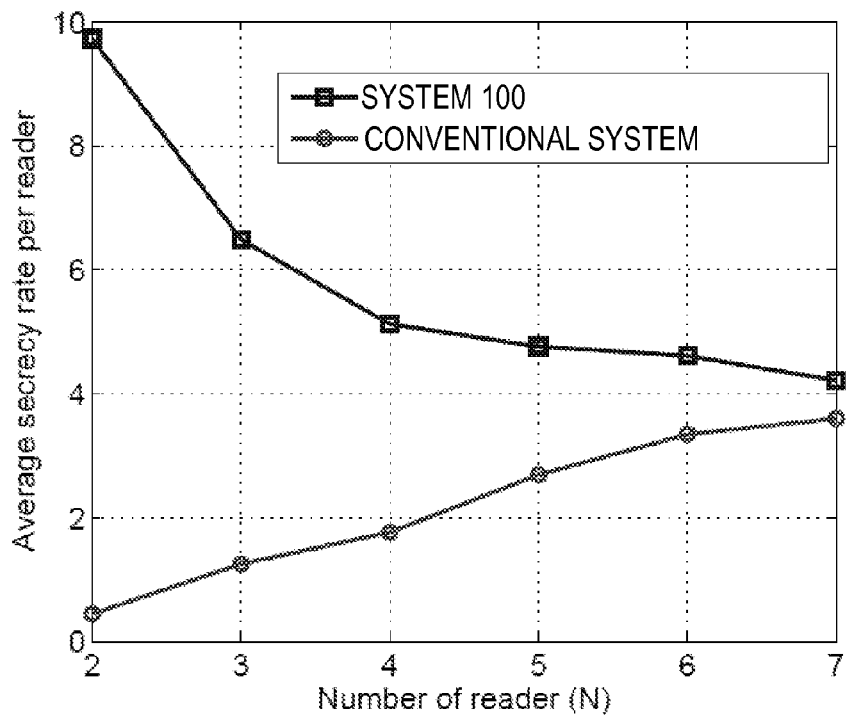
FIG. 4 shows a graph comparing secrecy rate of a conventional system and a system in accordance with principles disclosed herein.

FIG. 4 shows a graph comparing secrecy rate of a conventional system and secrecy rate of a system in accordance with principles disclosed herein. In FIG. 4, the performance of an embodiment of the system 100 is assessed by showing the average secrecy rate achieved per reader as the number of readers varies for a network with six eavesdroppers. FIG. 4 shows that as the number of readers increases, the average secrecy rate achieved by the system 100 decreases while that of the conventional system increases. This is due to the fact that the use of artificial noise in combination with the CW carrier signal increases the reader-to-reader interference in the network and, thus, the inter-reader interference becomes significant for larger networks thereby decreasing the secrecy rate of the system 100. In contrast, for the conventional system, as more readers and tags are deployed for a fixed number of eavesdroppers, the average secrecy rate increases. FIG. 4 shows that, at all illustrated network sizes, the system 100 yields significant performance gains of at least 17% relative to the conventional system (with seven readers).

Figure 5:
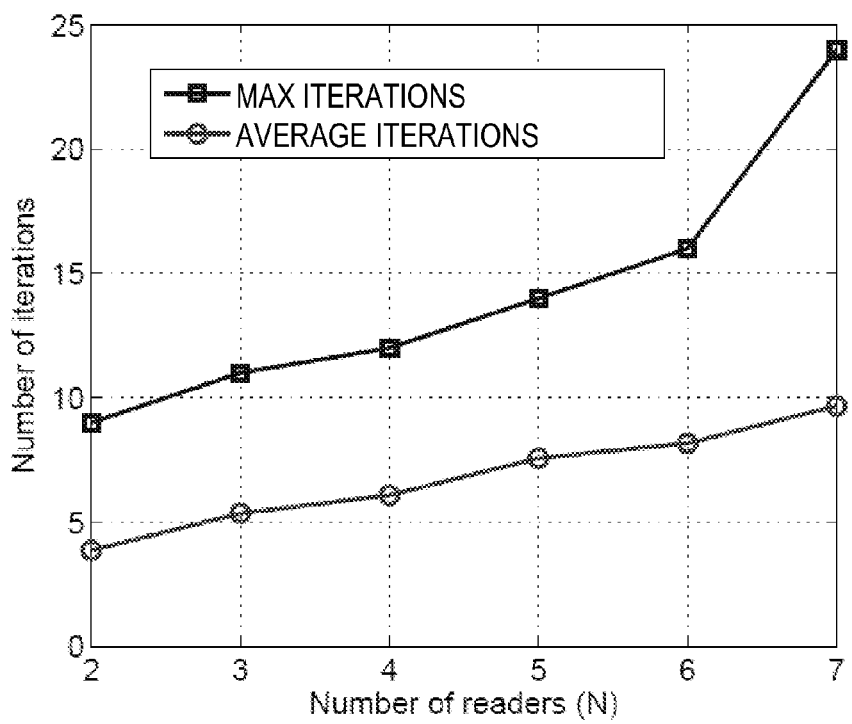
FIG. 5 shows a graph showing the number of iterations applied to reach a Nash equilibrium in accordance with principles disclosed herein.

FIG. 5 shows a graph showing the average number of iterations and the maximum number of iterations applied to reach a Nash equilibrium in accordance with principles disclosed herein. In FIG. 5, as the number of readers increases, the total number of iterations required for convergence to a Nash equilibrium increases. This is due to the fact that, as the number of readers increases, the possibility of reader-to-reader interactions increases, and, thus, additional best response actions are required prior to convergence. FIG. 5 shows that the average and the maximum number of iterations vary, respectively, from 3:9 and 9 with two readers, and up to 9.2 and 24 with seven readers.

The above discussion is meant to be illustrative of the principles and various implementations of the present disclosure. Numerous variations and modifications will become apparent to those skilled in the art once the above disclosure is fully appreciated. Although embodiments of the invention have been described herein by reference to RFI systems, those skilled in the art will understand that embodiments of the invention encompass a wide variety of backscatter communication systems. It is intended that the following claims be interpreted to embrace all such variations and modifications.

What is claimed is:

1. A backscatter communication system, comprising:
a reader configured to receive backscatter transmissions, the reader comprising:
a transmitter configured to emit a radio frequency signal to induce backscatter communication, the transmitter comprising: a continuous wave carrier signal generator that produces a continuous wave carrier signal; and
a noise signal generator that generates a noise signal; wherein the transmitter is configured to: add the continuous wave carrier signal and the noise signal to produce a combined signal that is a sum of the continuous wave carrier signal and the noise signal; and transmit the combined signal to induce backscatter communication; and
a power allocation subsystem configured to iteratively: observe transmissions of a neighboring reader; and adjust, based on the observed transmissions of the neighboring reader, an amount of power to be allocated to each of the continuous wave carrier signal and the noise signal during transmission of the combined signal to induce backscatter communication, wherein power (P) of the combined signal is held constant, and power of the noise signal and power of the carrier signal are adjusted as aP (a<1) and (1−a)P respectively; wherein (0 <α<1).

2. The system of claim 1, wherein the power allocation subsystem is configured to determine the amount of power allocated to transmission of each of the continuous wave carrier signal and the noise signal by selecting power allocations that maximize a function representing a total secrecy rate for transmissions in the system.

3. The system of claim 1, wherein the power allocation subsystem is configured to determine the amount of power allocated to transmission of each of the continuous wave carrier signal and the noise signal by iteratively adjusting the power allocated until a Nash equilibrium is achieved.

4. The system of claim 1, wherein the noise signal is one of a random noise signal and a pseudo-random noise signal.

5. The system of claim 1, wherein the noise signal increases the secrecy rate of the backscatter transmissions.

6. The system of claim 1, wherein the noise signal induces interference in an eavesdropper monitoring the backscatter transmissions.

7. The system of claim 1, further comprising at least on tag configured to receive the combined signal and wirelessly transfer information from the tag via backscatter transmission.

8. The system of claim 1, wherein the reader comprises a receiver configured to detect information in the backscatter transmissions by cancelling the noise signal from the received backscatter transmissions.

9. A method for backscatter communication, comprising:
generating a continuous wave carrier signal;
generating a noise signal;
adding the continuous wave carrier signal and the noise signal to produce a combined signal that is a sum of the continuous wave carrier signal and the noise signal;
iteratively:
observing transmissions of a neighboring reader; and
adjusting, based on the observed transmissions of the neighboring reader, an amount of power to be allocated to each of the continuous wave carrier signal and the noise signal during transmission of the combined signal; wherein the adjusting comprises holding power (P) of the combined signal constant, and changing power allocated to the noise signal and power allocated to the carrier signal as aP (a<1) and (1−a)P respectively, wherein (0<α<1);
transmitting the combined signal;
receiving a backscatter transmission induced by the combined signal; and
extracting information encoded in the backscatter transmission by filtering the noise signal received with the backscatter transmission.

10. The method of claim 9, wherein the determining comprises selecting power allocations that maximize a function representing a total secrecy rate for transmissions in the system.

11. The method of claim 9, wherein the determining comprises iteratively adjusting the power allocated until a Nash equilibrium is achieved.

12. The method of claim 9, further comprising inducing, via the noise signal, interference in an eavesdropper monitoring the backscatter transmission.

13. The method of claim 9, further comprising increasing, via the noise signal, a secrecy rate of the backscatter transmission.

14. A radio frequency identification (RFID) reader, comprising:
a transmitter configured to:
add a continuous wave carrier signal and a noise signal to produce a combined signal that is a sum of the continuous wave carrier signal and the noise signal; and
emit the combined signal to induce backscatter communication by an RFID tag; and
a power allocation subsystem configured to iteratively:
observe transmissions of a neighboring reader; and
adjust, based on the observed transmissions of the neighboring reader, an amount of power to be allocated to each of the continuous wave carrier signal and the noise signal during transmission of the combined signal to induce backscatter communication, wherein power (P) of the combined signal is held constant, and power of the noise signal and power of the carrier signal power are adjusted as aP (a<1) and (1−a)P respectively; wherein (0<α<1).

15. The RFID reader of claim 14, wherein the power allocation subsystem is configured to determine the amount of power allocated to transmission of each of the continuous wave carrier signal and the noise signal by selecting power allocations according to a function representing a total secrecy rate for the backscatter communication.

16. The RFID reader of claim 14, wherein the power allocation subsystem is configured to determine the amount of power allocated to transmission of each of the continuous wave carrier signal and the noise signal by iteratively adjusting the power allocated until a Nash equilibrium is achieved.

17. The RFID reader of claim 14, further comprising a receiver configured to detect information in the backscatter transmission by cancelling the noise signal from a received backscatter transmission.

18. The RFID reader of claim 14, wherein the noise signal increases a secrecy rate of the backscatter transmission by inducing interference that inhibits reception of the backscatter transmission by an eavesdropper.

19. The system of claim 1, wherein the secrecy rate increases as a number of interfering readers decreases.

20. The system of claim 1, wherein the power allocation subsystem is configured to continue iterative adjustment of the amount of power to be allocated to each of the continuous wave carrier signal and the noise signal until the power allocation subsystem is unable to improve the secrecy rate by changing the amount of power to allocated to the noise signal.

* * * * *